United States Patent [19]
Röder

[11] Patent Number: 5,497,659
[45] Date of Patent: Mar. 12, 1996

[54] METHOD FOR MEASURING FORCES IN A SUPPLY ROLL

[75] Inventor: Klaus W. Röder, Würzburg, Germany

[73] Assignee: Koenig & Bauer Aktiengesellschaft, Wurzburg, Germany

[21] Appl. No.: 354,757

[22] Filed: Dec. 8, 1994

[30] Foreign Application Priority Data

Dec. 8, 1993 [DE] Germany ............................ 43 41 800.7

[51] Int. Cl.⁶ .................................................. B65H 23/00
[52] U.S. Cl. ................................................. 73/159; 226/28
[58] Field of Search ............................... 73/159, 862.541; 177/245; 226/26, 28

[56] References Cited

U.S. PATENT DOCUMENTS

| | | | |
|---|---|---|---|
| 3,059,870 | 10/1962 | Hall et al. ................................. | 226/26 |
| 3,330,154 | 7/1967 | Habern et al. . | |
| 3,724,733 | 4/1973 | Schaffer et al. ........................... | 226/44 |
| 4,674,310 | 6/1987 | Ginzburg ................................... | 73/159 |
| 4,691,579 | 9/1987 | Ekola ................................. | 73/862.473 |
| 4,699,606 | 10/1987 | Whitley, Jr. et al. ............... | 73/862.474 |
| 4,896,808 | 1/1990 | Bolza-Schünemann et al. ... | 242/418.1 |
| 4,970,895 | 11/1990 | Houghton et al. ........................ | 73/159 |
| 5,138,878 | 8/1992 | Cresson et al. .......................... | 73/159 |
| 5,365,796 | 11/1994 | Lin et al. ............................ | 73/862.391 |

FOREIGN PATENT DOCUMENTS

| | | |
|---|---|---|
| 2510913 | 9/1976 | Germany . |
| 2843277 | 7/1986 | Germany . |
| 4127631 | 4/1992 | Germany . |
| 9212928.5 | 1/1993 | Germany . |

*Primary Examiner*—Richard Chilcot
*Assistant Examiner*—Eric S. McCall
*Attorney, Agent, or Firm*—Jones, Tullar & Cooper

[57] ABSTRACT

A roll support for a web fed rotary printing press supports a supply roll of a material web between clamping cones carried at free ends of support arm pairs. An array of strain gauges are attached either to the support arms or to a force measuring bushing for the clamping cones and are used to provide values indicative of the weight or bearing force of the supply roll. These values can be used to determine the amount of material remaining on the supply roll or to determine a weight imbalance in the supply roll.

1 Claim, 2 Drawing Sheets

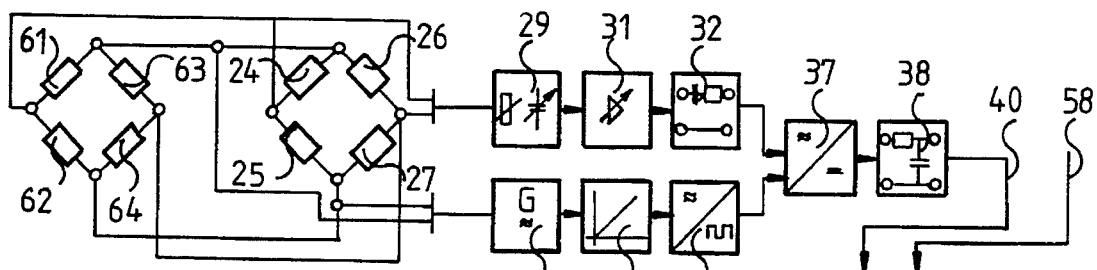
FIG. 3
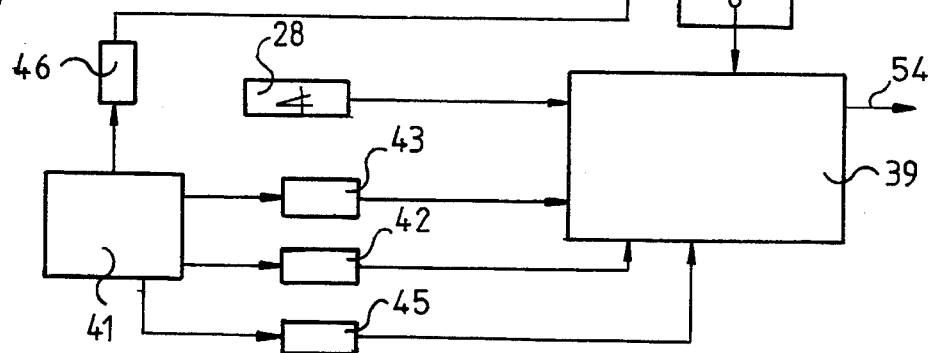
FIG. 4
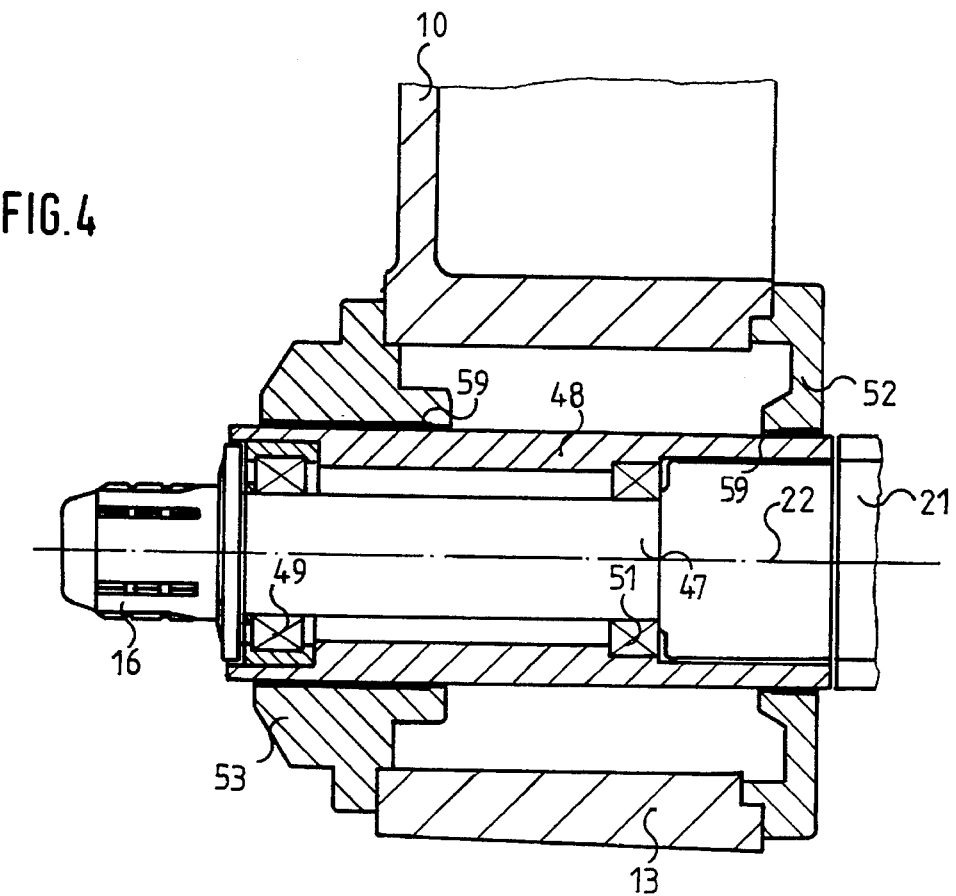

METHOD FOR MEASURING FORCES IN A SUPPLY ROLL

FIELD OF THE INVENTION

The present invention is directed generally to a method and apparatus for measuring the forces of a supply roll. More particularly, the present invention is directed to a method and apparatus for determining immanent or inherent forces of a supply roll. Most specifically, the present invention is directed to a roll support and to a method of determining the inherent forces of a supply roll placed on a roll support. The supply roll is held by support arms with these support arms carrying a plurality of strain gauges. The values provided by the strain gauges to a computer, as well as values regarding web width and roll material density, are usable to provide an instantaneous determination of the amount of web material remaining on the supply roll at any time.

DESCRIPTION OF THE PRIOR ART

In web fed rotary printing presses and in other applications in which a web of material is being unwound from a supply roll, it is frequently necessary to be able to ascertain the amount of material remaining on the roll. One prior art arrangement for determining the size or amount of material in a material web remaining on a take-off roll is shown in German Patent Publication DE 28 43 277 C2. This publication discloses a circuit arrangement by means of which the continuous web length of the web material being unwound from the take-off roller is checked and the web length still remaining on the take-off roller is calculated.

SUMMARY OF THE INVENTION

It is an object of the present invention to provide a roll support for a material web roll.

Another object of the present invention is to provide a roll support usable to measure the inherent force of a supply roll of material.

Still another object of the present invention is to provide a method and apparatus for determining the immanent forces of a supply roll placed in a roll support.

Yet a further object of the present invention is to provide a method and apparatus for determining imbalances of a supply roll on a roll support.

Even still another object of the present invention is to provide a method and apparatus for determining inherent forces of a supply roll in a static or dynamic orientation.

As will be discussed in detail in the description of the preferred embodiments which is presented subsequently, the roll support in accordance with the present invention utilizes spaced support arms, secured to a support spindle, to support supply rolls of a web material, such as paper, between outboard ends of the support arms. The supply roll is held between clamping cones. Each of the support arms can be provided with a plurality of strain gauges on its four surfaces. These strain gauges are connected in a Wheatstone bridge arrangement and supply values corresponding to the immanent force or inherent force of the supply roll supported between the damping cones. This inherent force value is supplied to a computer, together with additional information about web width, material specific weight, and angular positioning of the support arms. This allows a determination of the amount of web material remaining on the supply roll to be made.

The roll support and the method and apparatus for determining the inherent forces of a supply roll placed on the roll support in accordance with the present invention provide a number of benefits. Because it is now possible to make a continuous in-line weight determination in the support arms of the roll changer, it is possible, after making an initial weight determination and after the subsequent removal of any web material that may have been damaged in transport, to determine the net weight and thus the web length of the material on the supply roll. This will also allow a determination to be made of the length of the material web remaining on a roll, for example following the end of a defined production period. This will allow a determination to be made regarding the possibility of use of the supply roll in a subsequent production run. It is also possible, in accordance with the present invention, to effortlessly signal a balance error in the supply roll that is supported between the clamping cones of the roll support. Such a balance error can occur because of improper clamping of the supply roll between the clamping cones or can be due to a supply roll that may have been damaged or deformed during storage or transport. The detection of such a balancing error while the supply roll is in a static mode will allow corrective action to be taken before the supply roll is started to turn.

The present invention also allows the press operator to determine whether or not a depleted supply roll has been completely removed from between the retracted clamping cones. With the size of modern presses, it is not always possible for the press operator to visually determine if the depleted roll, which is almost depleted of a material web, has been removed from the roll support. A fresh supply roll can only be put in place if the empty roll has been removed.

The roll support in accordance with the present invention overcomes the limitations of the prior art. It is a substantial advance in the art.

BRIEF DESCRIPTION OF THE DRAWINGS

While the novel features of the roll support in accordance with the present invention are set forth with specificity in the appended claims, a full and complete understanding of the invention may be had by referring to the detailed description of the preferred embodiments which is set forth subsequently, and as illustrated in the accompanying drawings, in which:

FIG. 3 is an electrical evaluation current in accordance with the present invention; and FIG. 4 is a sectional view of a portion of a support arm for the roll support shown in FIG. 1 and showing a second preferred embodiment of the present invention.

DETAILED DESCRIPTION OF THE PREFERRED EMBODIMENTS

Figure 1:
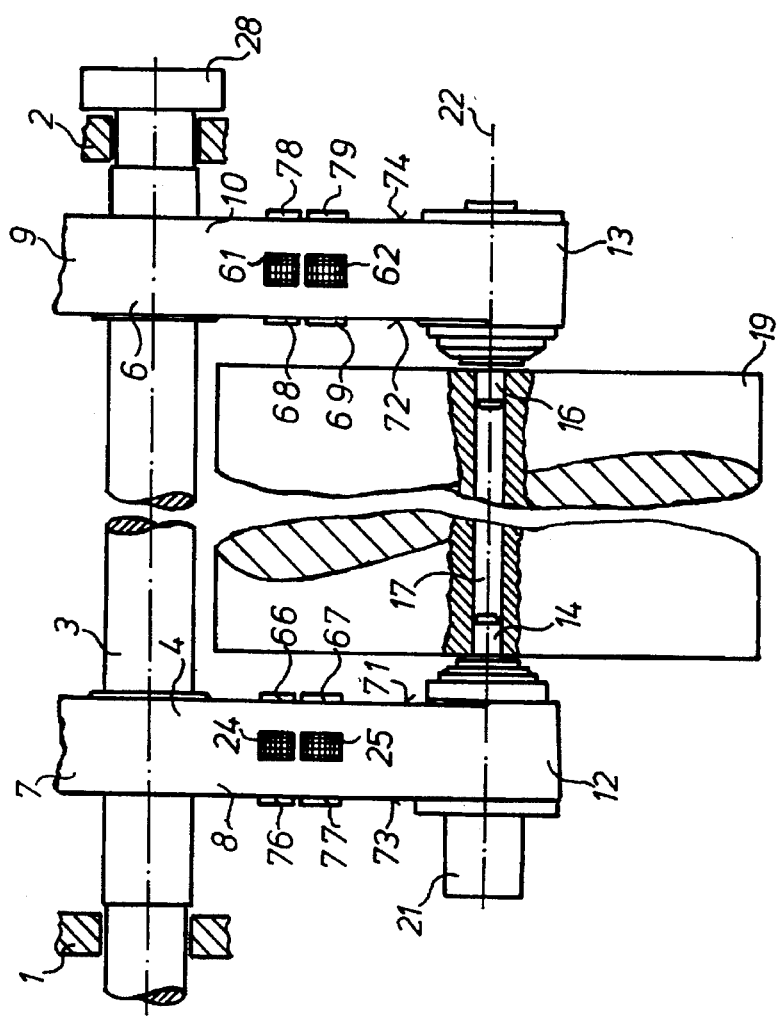
FIG. 1 is a front elevation view of a first preferred embodiment of a roll support in accordance with the present invention and showing a supply roll mounted on the roll support.

Referring initially to FIG. 1, there may be seen a first preferred embodiment of a roll support assembly in accordance with the present invention. It will be understood that the roll support is usable as a supply device, in the form of a roll changer, in a web-fed rotary printing press of generally known construction and operation. The roll support and roll changer operates in its generally conventional manner to support one or more rolls of web material, such as paper, and to deliver the material to the printing presses of the printing assembly. Since the printing presses generally form no part of the present invention, they will not be discussed in detail.

Figure 2:
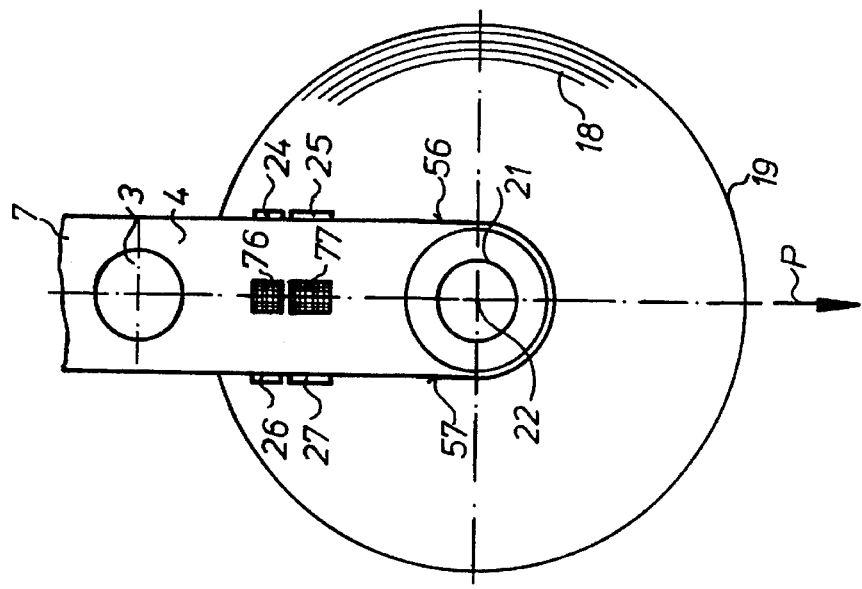
FIG. 2 is an end elevation view of the roll support in FIG. 1 and with the side frames removed for clarity.

As may be seen in FIG. 1 and also by referring to FIG. 2, the roll support in accordance with the present invention is provided with a support spindle 3 that is supported for rotation between two schematically depicted side frames 1 and 2 of the printing press. The support spindle 3 is rotatable by means of a conventional drive unit, which is not specifically shown in the drawings. The support spindle 3 carries two support arm assemblies 4 and 6 which are spaced from each other, are parallel to each other, and are shiftable toward and away from each other axially along the support spindle 3 while also being capable of being positively connected with the support spindle 3. Each support arm assembly 4 and 6 is formed with two diametrically oppositely extending support arms. Thus support arm assembly 4 includes support arms 7 and 8 whereas support arm assembly 6 includes support arms 9 and 10. As may be seen in FIG. 1, support arms 7 and 9, which are only partially shown in FIG. 1, form a first operative pair while support arms 8 and 10 form a second operative pair. Both pairs of support arms 7 and 9, and 8 and 10 are, in accordance with the present invention, structured and operable in a similar manner. While only the support arm pair 8 and 10 will be discussed in detail subsequently, it will be understood that the discussion is equally applicable to the support arm pair 7 and 9.

Free ends 12 and 13 of the cooperating pair of support arms 8 and 10 have clamping cones 14 and 16, as seen in FIG. 1, which can be moved toward and away from each other in the axial direction and which engage the ends of a core 17 between their front faces. A material web 18, for example paper, has been wound into a supply roll 19 about the core 17. The supply roll 19 can be accelerated, either by means of a conventional drive which acts on the outer shell of roll 19 in the circumferential direction, or a drive (not shown) acting on the center of the supply roll 19. The supply roll 19 can be braked through the clamping cone 14 and the core 17 by means of a brake 21, which may be securely fixedly flanged on the support arm 8 at the free end 12 of the support arm 8 on the side of the support arm 8 remote from the supply roll.

In accordance with the present invention, and as may be seen by referring to FIGS. 1 and 2, a plurality of conventional strain gauges 24, 25, 26, 27 and 61, 62, 63, 64 have been attached to the right and left lateral surfaces 56, 57 of the support arms 8, 10. The wire strain gauges 63, 64 are not specifically shown in the drawing. The wire strain gauges 24 to 27 and 61 to 64, respectively can be glued to the support arms 8 and 10 and are located in an area of the support arms 8 and 10 which is close to the support spindle 3. In the depiction shown in FIG. 2, the wire strain gauges 24 and 25 are applied to a right lateral surface 56 of the support arm 8, and the wire strain gauges 26 and 27 are applied to a left lateral surface 57 of the support arm 8. In a similar manner, the wire strain gauges 61 and 62 are applied to a right lateral surface 56 of the support arm 10, and the wire strain gauges 63 and 64 are applied to a left lateral surface 57 of the support arm 10. The wire strain gauges 26, 27 and 63, 64 point in a clockwise direction of rotation, and the wire strain gauges 24, 25 and 61, 62 point in a counterclockwise direction of rotation. These directions of rotation are of the arms 8 and 10 about the axis of rotation of the support spindle 3. Thus, as viewed in FIG. 2, the strain gauges 24, 25 and 26, 27 all point upwardly. Measuring takes place in a range in which the material deformation of the support arms 8 and 10 is proportional to the weight or the effect of the forces exerted by the supply roll 19 on the support arms 8 and 10. This force is depicted by the downwardly directed arrow P shown in FIG. 2 and would act in this direction when the support arms 8 and 10 are in the position shown in FIG. 2.

As may be seen in FIG. 1, the support spindle is provided with an angle of rotation transmitter 28 which is secured to the support spindle 3 in the vicinity of the side frame 2. As has been previously discussed, the roll support arm assemblies 4 and 6, which are constituted by the support arms 7 to 10 arranged thereon, are disposed on the support spindle 3 so as to be horizontally displaceable in the axial direction of the spindle 3 in order to receive supply rolls 19 of different widths. The roll support arm assemblies 4 and 6 are also rotatable together with the support spindle 3, so that the support arm pairs 7, 9 and 8, 10 can also take up a position different from that shown in FIGS. 1 and 2. For example, the support arms 8 and 10 can take up a horizontal position, such as may be required during the preparation of an adhesive tip on a new supply roll. They can also take up positions in between the horizontal or vertical positions, for example to receive a fresh supply roll 19 from a device conveying the supply roll 19.

Referring now to FIG. 3, there may be seen an appropriate evaluation circuit in accordance with the present invention. The wire strain gauges 24 to 27 and 61 to 64 correspond to the resistors 24 to 27 and 61 to 64 of a known Wheatstone bridge circuit with post amplification. The outputs of the bridge circuit are connected on one side through an RC balancer 29, an amplifier 31, a bandpass filter 32 and, on the other side, through a frequency generator 33, a 90° phase shifter 34 and a sine rectangular converter 36 with a phase-correct demodulator 37 and, through a low pass band filler. The values from the various strain gauges 24–27 and 61–64 are thus processed to arrive at a first output signal 40. This signal 40 is then forwarded to a computer 39 where it is processed further and is used in conjunction with other inputs to arrive at an indication of the amount of the material web remaining in a specific supply roll 19.

The various electrical elements 29 to 38, as discussed above, can be placed into a separate housing and are connected with each other, as well as with the wire strain gauges 24 to 27 and 61 to 64 by suitable electrical lines, not shown in detail. The computer 39 can be disposed in the machine control console of the printing press or at another central location. A keyboard 41 is associated with the computer 39, and is used to enter various values, such as the weight or the specific weight 42 of the material web 18 and the width 43 of the material web 18 into the computer 39. In addition, it is possible to selectively supply the computer 39, through the mechanism of a change-over switch 44, a separate, different signal 58, resulting from the weighing of a second supply roll, not shown, on the support arms 7, 8 indicated in FIG. 1. This second signal 58 is obtained through suitable technical means which correspond to those through which the other measured values 40 were determined, and which were supplied to the computer 39 via the change-over switch 44. The change-over switch 44 can be operated by a control device 46 which can be operated by the keyboard 41, for example, by means of a magnetic force. The computer 39 is also supplied with information regarding the relative angular positions of the support arm pairs 7,9 and 8,10 through the angle of rotation transmitter 28. As seen in FIG. 3, the data from transmitter 28 is supplied to the computer 39.

The operation of the roll support in accordance with the first preferred embodiment of the present invention, as described above, is as follows. A voltage is supplied to the bridge circuit represented in FIG. 3 and corresponding to the strain gauges on the support arm pair 8 and 10. By means of the deformation of the wire strain gauges and in accordance with the respective angle of rotation position of the support arms 8, 10, a differential voltage is measured between the wire strain gauges. This differential voltage is amplified and evaluated by the electrical elements 29–38, as discussed above, and makes possible, taking into consideration the angular position of the support arms 8, 10, a calculation of the momentary weight of a supply roll 19. The support arms 8 and 10, as well as the support arms 7 and 9, are calibrated in accordance with their angle of rotation position. The weight of the core 17 receiving the material webs 18 is known. After entering the width 43 and the specific weight 42 or the weight of the material web 18 into the computer 39, the length of a material web 18 on a supply roll 10 or a remnant of a roll can be determined. Thus there is provided, by indirect measurement of the weight or bearing force P by means of the wire strain gauges of the support arms, a determination of the length of the material web 18 on a supply roll 19.

In the previously described arrangement, the bearing or weight forces P of the supply roll 19 placed on the shaft of the roll support arms 4 and 6 are measured in the static state of the supply roll 19. The appropriate signal 40, or 58, together with the signals resulting from entering the width 43 and the specific weight 42 of the material web 18 as well as the indications of the angle of rotation transmitter 28, generate a value regarding the length of the material web 18 on the supply roll 19.

In a second preferred embodiment of a roll support arrangement in accordance with the present invention, a portion of a support arm 10 of the support arm pair 8 and 10 is shown in a longitudinal section representation in FIG. 4. A shaft 47, which is used to support a clamping cone 16 for receiving one end of the core 17 of a supply roll 19 on its first end, is located at the free end 13 of the support arm 10. The cone support shaft 47 is coaxially surrounded by a slide bushing 48 and is supported on the slide bushing 48 at its first or inner end by a generally conventional force-measuring bearing 49 and at its second or outer end by a ball bearing 51. The cone support shaft 47 is thus rotatably seated in this slide bushing 48. The force-measuring bearing 49, in which the cone support shaft 47 is seated, consists of two annular rings, not shown in detail, namely an inner ring which receives a rolling bearing, and an outer ring fastened on the slide bushing 48. These inner and outer rings are connected to each other by a bar. This bar forms the actual measuring element. If the force-measuring bearing 49 is put under a load by a bearing force P, the bar is stressed in accordance with its angle of rotation position as, for example, by bending. The deflections of the bar result in stretching and compression along the flanks or edges of the bar. The stretching and compression are proportional to the force or weight of the supply roll 19 and are used to measure the bearing force P. This measurement takes place with four wire strain gauges, which are analogous to the wire strain gauges 24 to 27, and which are applied on both sides on the flanks of the bar portion of the force-measuring bearing 49 and which provide a direct measurement of the bearing force P. Four wire strain gauges, analogous to the wire strain gauges 61 to 64, will be employed in a second force-measuring bearing 50, not shown and which is carried by arm 8. The second end of the shaft 47 is connected in a nonpositive and positive manner with a brake 21 that is fixed on the support arm 10. The slide bushing 48 can be displaced in the direction of the axis of rotation 22 of the supply roll 19, and, in this case, is also restrained in the support arm 10 at the side near the brake 21 by a flange 52, and on the side near the cone by a flange 53, wherein the flanges 52, 53 are fastened in a nonpositive and positive manner with the end 13 of the support arm 10. A suitable friction bearing 59 is disposed in each of the areas of the flanges 52, 53 between the slide bushing 48 and the flanges 52 and 53 supporting the slide bushing 48 on both ends, and each friction bearing 59 is provided with a circular opening.

As was mentioned above, the support arm 8 is, in accordance with the present invention, structured in the same manner and with the same shaft 47, force-measuring bushing 49 and the like, as discussed with reference to support arm 10, and as depicted in FIG. 4. The various strain gauges which, as has been also discussed above, are secured to the bar portion of the force measuring bushings 49 for the clamping cone support shafts 48 of the support arms 8 and 10 are connected to the same evaluation circuits and elements as was discussed in accordance with the first preferred embodiment, and as is shown in FIG. 3.

A possible balance error of a supply roll 19 placed on the shaft between the clamping cones 14 and 16 of the roll support arm assemblies 4 and 6 can be detected by measuring the bearing forces P in the dynamic state during rotational movements of the supply roll 19 by means of the measured values determined by the measured value pick-ups or strain gauges 24 to 27 and 61 to 64. In the process, the measured values are converted by the known evaluation circuit into proportional electrical signals 40, 58 and are supplied to the computer 39, as discussed above. A threshold value 45 for the centrifugal force P will have been entered into the computer 39 by use of the keyboard 41 and a signal 54 will be generated if this threshold value 45 is exceeded, as would be the case if the supply roll 19 is out of balance. Generation of signal 54 can automatically lead to a reduction of the rotational speed of the supply roll 19 or to the switching off of the machine. The signal 54 can also be provided as an optical or acoustical signal.

It is furthermore possible, in accordance with the present invention, to position or mount suitable wire strain gauges 66, 67; 68, 69 on the lateral inner surfaces 71, 72 of the support arms 8 and 10, which are near the supply roll, as well as to dispose wire strain gauges 76, 77; 78, 79 on the lateral outer surfaces 73, 74 of the support arms 8 and 10, which are remote from the supply roll. In an analogous manner, wire strain gauges are applied to the support arms 7 and 9, not shown. These wire strain gauges 66 to 69 and 76 to 79 have the same function as the previously disclosed wire strain gauges 24 to 27 and 61 to 64 alternatingly disposed on the right and left lateral surfaces 56 and 57 of the support arms 7 to 10.

While preferred embodiments of a roll support and its method for use in determining inherent forces of a supply roll placed in the roll support in accordance with the present invention have been set forth fully and completely hereinabove, it will be apparent to one of skill in the art that a number of changes in, for example, the overall size of the roll support, the type of material web in the supply roll, the drive assembly for the support spindle and the like could be made without departing from the true spirit and scope of the present invention which is accordingly to be limited only by the following claims.

What is claimed is:

1. A method for determining forces in a web supply roll including the steps of:

providing a roll support having a pair of spaced supply roll support arms;

providing a plurality of strain gauges on each of said support arms;

placing a web supply roll on a shaft;

supporting said web supply roll on said shaft between said support arms;

measuring a bearing force exerted by said supply roll on said support arms while maintaining said supply roll in a static state;

using said strain gauges to provide values;

converting said values from said strain gauges into proportional electrical signals;

supplying said electrical signals to a computer;

supplying said computer with additional values for a width and specific weight of a material web on said supply roll;

using an angle rotation transmitter and measuring an angle position of said support arms;

supplying said angle position to said computer; and using said computer supplied with said values and said angle position and determining a length of said material web remaining on said supply roll.

* * * * *